United States Patent
Karstens

(10) Patent No.: US 10,606,434 B2
(45) Date of Patent: *Mar. 31, 2020

(54) DESKTOP ICON MANAGEMENT AND GROUPING USING DESKTOP CONTAINERS

(71) Applicant: INTERNATIONAL BUSINESS MACHINES CORPORATION, Armonk, NY (US)

(72) Inventor: Christopher K. Karstens, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 15/700,107

(22) Filed: Sep. 9, 2017

(65) Prior Publication Data

US 2017/0371459 A1     Dec. 28, 2017

Related U.S. Application Data

(63) Continuation of application No. 12/251,178, filed on Oct. 14, 2008, now Pat. No. 9,760,234.

(51) Int. Cl.
*G06F 3/048*     (2013.01)
*G06F 3/0481*    (2013.01)
*G06F 3/0484*    (2013.01)

(52) U.S. Cl.
CPC .......... *G06F 3/048* (2013.01); *G06F 3/04817* (2013.01); *G06F 3/04847* (2013.01)

(58) Field of Classification Search
CPC .... G06F 3/048; G06F 3/04817; G06F 3/0481; G06F 3/04842; G06F 3/04886
See application file for complete search history.

(56) References Cited

U.S. PATENT DOCUMENTS

| | | |
|---|---|---|
| 5,459,825 A | 10/1995 | Anderson et al. |
| 5,708,786 A | 1/1998 | Teruuchi |
| 5,721,853 A | 2/1998 | Smith |
| 5,767,852 A | 6/1998 | Keller et al. |

(Continued)

OTHER PUBLICATIONS

Heddings, L., "Save and Restore Desktop Icon Layout in Windows Vista," [online] How to Geek LLC © 2006-2017, Aug. 26, 2007, retrieved from the Internet: <https://www.howtogeek.com/howto/windows-vista/save-and-restore-desktop-icon-layout-in-windows-vista/>, 3 pg.

(Continued)

*Primary Examiner* — Amy M Levy
(74) *Attorney, Agent, or Firm* — Cuenot, Forsythe & Kim, LLC

(57) ABSTRACT

A set of desktop icons on a graphical user interface (GUI) desktop can be selected, which marks the icons as being associated with a desktop container. In the GUI, a visual depiction that the selected desktop icons are associated with the desktop container can occur. The desktop container can be a GUI object for grouping a set of desktop icons and for manipulating a grouped set of desktop icons as a group. A user interaction with the desktop container can be received, which results in a container action being performed. The container action can affect each of the selected desktop icons and/or can affect targets to which each of the selected desktop icons point.

18 Claims, 3 Drawing Sheets

(56) References Cited

U.S. PATENT DOCUMENTS

| | | | |
|---|---|---|---|
| 5,784,061 | A | 7/1998 | Moran et al. |
| 5,801,699 | A | 9/1998 | Hocker et al. |
| 5,838,317 | A | 11/1998 | Bolnick et al. |
| 5,959,624 | A | 9/1999 | Johnston et al. |
| 6,020,888 | A | 2/2000 | Ho |
| 6,043,817 | A | 3/2000 | Bolnick et al. |
| 6,046,739 | A | 4/2000 | MacPhail |
| 6,307,562 | B1 | 10/2001 | Taivalsaari |
| 6,426,761 | B1 | 7/2002 | Kanevsky et al. |
| 7,218,330 | B1 | 5/2007 | Winkenbach et al. |
| 7,503,009 | B2 | 3/2009 | Peters |
| 9,542,081 | B2 * | 1/2017 | Ording .................. G06F 3/0484 |
| 9,760,234 | B2 | 9/2017 | Karstens |
| 2002/0033849 | A1 | 3/2002 | Loppini et al. |
| 2003/0023587 | A1 | 1/2003 | Dennis et al. |
| 2004/0017376 | A1 | 1/2004 | Tangliabue et al. |
| 2004/0113940 | A1 | 6/2004 | Brockway et al. |
| 2004/0177319 | A1 | 9/2004 | Horn |
| 2005/0055639 | A1 | 3/2005 | Fogg |
| 2005/0060354 | A1 | 3/2005 | Keohane et al. |
| 2005/0066292 | A1 | 3/2005 | Harrington |
| 2005/0125736 | A1 | 6/2005 | Ferri et al. |
| 2006/0010397 | A1 | 1/2006 | Laffey |
| 2006/0036568 | A1 | 2/2006 | Moore et al. |
| 2006/0112354 | A1 | 5/2006 | Park et al. |
| 2006/0136246 | A1 | 6/2006 | Tu |
| 2006/0224991 | A1 | 10/2006 | Stabb et al. |
| 2007/0074126 | A1 | 3/2007 | Fisher et al. |
| 2007/0079255 | A1 | 4/2007 | Gourdol et al. |
| 2007/0174782 | A1 | 7/2007 | Russo |
| 2007/0186154 | A1 | 8/2007 | Anthony et al. |
| 2007/0250613 | A1 | 10/2007 | Gulledge |
| 2008/0168403 | A1 | 7/2008 | Westerman et al. |
| 2008/0307350 | A1 | 12/2008 | Sabatelli et al. |
| 2008/0307358 | A1 | 12/2008 | Hintermeister et al. |
| 2008/0307359 | A1 | 12/2008 | Louch et al. |
| 2008/0307362 | A1 | 12/2008 | Chaudhri et al. |
| 2009/0307623 | A1 | 12/2009 | Agarawala et al. |
| 2010/0095248 | A1 | 4/2010 | Karstens |
| 2010/0169828 | A1 | 7/2010 | Ho et al. |
| 2010/0257059 | A1 | 10/2010 | Ujioka et al. |

OTHER PUBLICATIONS

Bott et al., "Windows Vista Inside Out," Microsoft Press, 2007, 4 pg.

Norris, G., "How to Group the Desktop Icons," Engineering.com, Inc. © 1998-2017, May 15, 2006, retrieved from the Internet: <http://www.tek-tips.com/viewthread.cfm?qid=1230311>, 3 pg.

"Icon Genesis Desktop and Icon Manager," [online] Product information, publicly available Feb. 5, 2007 at www.icongenesis.com, Retrieved via Internet Archive on [Oct. 5, 2016] 14 pg.

U.S. Appl. No. 12/251,178, Non-Final Office Action, dated Dec. 27, 2010, 12 pg.

U.S. Appl. No. 12/251,178, Final Office Action, dated May 25, 2011, 13 pg.

U.S. Appl. No. 12/251,178, Examiner's Answer, dated Oct. 3, 2013, 17 pg.

U.S. Appl. No. 12/251,178, Decision on Appeal, dated Jul. 5, 2016, 6 pg.

U.S. Appl. No. 12/251,178, Non-Final Office Action, dated Nov. 4, 2016, 15 pg.

U.S. Appl. No. 12/251,178, Final Office Action, dated Feb. 18, 2017, 19 pg.

U.S. Appl. No. 12/251,178, Notice of Allowance, dated May 5, 2017, 12 pg.

\* cited by examiner

100

Scenario 105

Scenario 130

DESKTOP ICON MANAGEMENT AND GROUPING USING DESKTOP CONTAINERS

BACKGROUND

The present invention relates to the field of user interface improvements and, more particularly, to improving desktop icon management and grouping using desktop containers.

Today's computing devices support a wide range of functionality and usability. As such, users often utilize the desktop area of a computing device to place important or frequently used items. These items are typically represented by icons which allow users to interact with files, applications, and various other interactive computing elements. A leading problem among users is the organization/management of desktop icons and especially grouping. Users who employ the desktop heavily can often be accosted with a sea of icons arranged haphazardly on the desktop. The user is often forced to rearrange the icons manually, especially if the user requires a particular organization for one set of icons and another organization for another set of icons. For instance, a user wanting to organize files by modification date and applications by name must resort to manually sorting each set. Further, if the user applies a sort organization scheme to the desktop icons, the result is all the icons, regardless of type and/or attributes, are sorted by that scheme.

Additionally, there is no means for users to group sets of logically similar icons together. For instance, a user may want to group productivity applications separately from game applications. To do so, the user must manually group each icon on the desktop and actively maintain the icon groupings. For example, when a new productivity application is installed, the icon may be placed in the top left hand corner of the desktop. The user must move the newly installed application icon to the application group manually. This can be a tedious process for users who frequently add, copy, move, and delete icons from the desktop.

Problems with the current state of desktop icon management further arise among users who employ mobile computers where resizing the desktop/screen resolution occurs frequently. For instance, a user of a laptop computer may use the laptop at a home workstation with a specific desktop resolution and a different resolution at a workstation at work. Desktop resizing can often negatively impact icon organization causing icons to lose their position and their position relative to other icons. When resizing occurs, icons are rearranged randomly to fit the new screen resolution or are moved to new positions which can be difficult to locate. For instance, when changing from a high desktop resolution (e.g., 1600×1200) to a lower desktop resolution (e.g., 1024× 768), icons which appear outside the screen resolution are moved to new locations which results in the icons losing their original organization scheme. The aforementioned problems with desktop icon management amounts to users being hesitant to employ the desktop as a high traffic area. This contradicts the purpose of the desktop area as the desktop is designed for high usage by the user. What is needed is an effective way to organize, manage, and group desktop icons.

DETAILED DESCRIPTION

Figure 1:
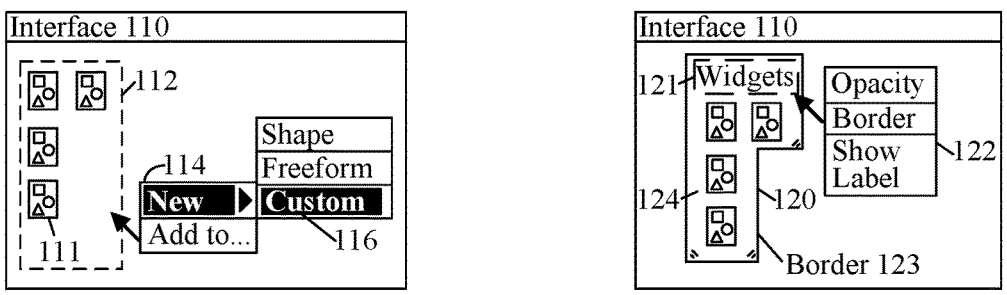
FIG. 1 is a schematic diagram illustrating a set of scenarios for creating and interacting with a desktop container in accordance with an embodiment of the inventive arrangements disclosed herein.
Figure 1:
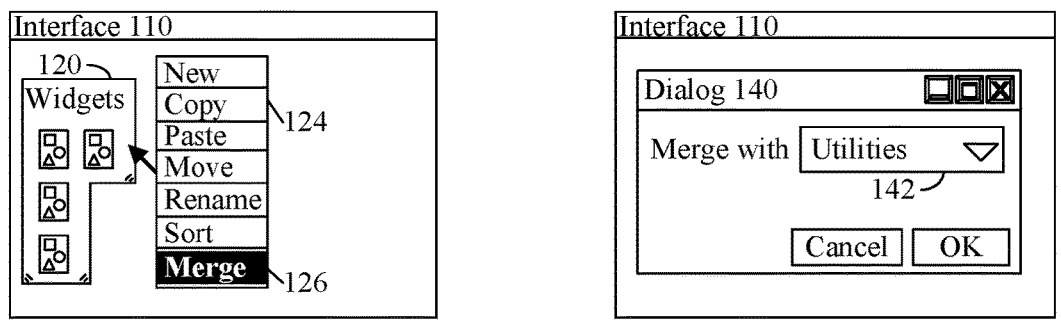

The present invention discloses a solution for improving desktop icon management and grouping using desktop containers, which can also be referred to as "GUI buckets". In the solution, a desktop container (GUI bucket) comprising of a screen width, height, and position can be visually presented on a desktop area. Users can add desktop icons to the container which can allow users to manage and group icons efficiently. Desktop containers, which can be user created, can be a polygon shape, freeform, and the like. For instance, a desktop container can be a rectangle container or a hand drawn shape using a lasso tool. Icons associated with the container can be presented within the container area. Containers can allow users to manage each icon individually or collectively. Zero or more icons can be included per container. Organizational schemes such as sorting, layouts, themes, colors, and the like can be user configured for each container without affecting the desktop organizational scheme. Further, changes made to a desktop ("container parent") can either affect the "child" containers or not depending upon user configurable settings. Container level operations such as copy/paste, move, and merge allow users to manage icons as groups easily. Some container level operations can affect one container, while others can affect multiple containers.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of scenarios 105, 130 for creating and interacting with a desktop container (e.g., GUI bucket) in accordance with an embodiment of the inventive arrangements disclosed herein. In scenario 105, 130, icon management and grouping can be facilitated by desktop container 120 in interface 110. Interface 110 can be a graphical user interface exposing a desktop area which can contain zero or more icons 111. Icons 111 can be pictographically linked executable interface elements enabling users to interact with files, folders, executable programs, widgets/gadgets, and the like. In scenario 105, a desktop container 120 can be created and can be configured to user specifications using menu 122. In scenario 130, container 120 can be managed through action menu 124. Desktop container 120 can be presented on interface 110 signified by one or more visual indicators. For instance, container 120 can be presented with a border 123 colored red to denote the area which the container 120 spans.

Once a desktop container 112, 120 is created, it can be manipulated within an interface 110 as if it were a single GUI object. For example, a container 112 can be moved from a left hand side of an interface 110 to a right hand side of the interface 110, which causes all included icons 111 to move in a corresponding fashion. Further, container-level options can be provided, such as minimizing a container, which can show only small icons for that container 112, 120, where restoring a container 112, 120 can show the full size icons. In one embodiment, containers 112, 120 can be docked to designated portions of a desktop. Within a desktop, behavior of a single container 112, 120 can be configured and/or behavior of all containers 112, 120 present can be configured. Importantly, the containers 112, 120 provide a means for organizing and manipulating icons 111 and other desktop objects 124 as a group.

In scenario 105, a desktop container 120 can be created to assist in managing icons 112 in interface 110. Newly created container 120 can inherit default settings from interface 110. Selected icons 112 can be added to a new desktop container 120 through menu 114 or through normal user interaction (e.g., drag and drop). Selection can be achieved through the use of a selection box tool, lasso tool, and the like. Selected icons 112 can be presented within the container 120 once the desktop container 120 is created. Desktop container 120 can be created based on one or more shapes which can include polygon shapes, user defined freeform shapes, custom shapes, and the like. For instance, custom shape entry 116 from menu 114 can be selected to create desktop container 120. In one embodiment, custom shape desktop containers can include container handles for manually resizing the container. In one embodiment, a contain can use lines (of a characteristic color or line style) that link icons 112 and other items together, where the linkages show that all items belong to a common container 120.

Once created, container 120 can be readily customized through one or more interfaces such as context menu 122. Container 120 can be positioned automatically by interface 110 or be manually positioned by a user. Container 120 can include multiple user configurable attributes such as border 123, area 124, layout, themes, behavior, and the like. Container 120 can be presented with a border 123 around the perimeter which can be one of a variety of colors, patterns, images, line types, and the like. Alternatively, each icon 111 can be presented with a border around the icon image indicating the icon 111 belongs to a specific container 120. For instance, each icon in container 120 can be presented with a green border around the icon image perimeter. In one embodiment, area 124 can be a colored region which can be specified by the user and/or selected by interface 110. Area 124 can be configured to appear as a shaded region, can include an image within the area 124, and the like. Container 120 visual indicators (e.g., border color) can be presented separately or in any combination thereof.

Menu 122 can enable user customization of container opacity attributes. Opacity controls can affect border 123, container area 124, icons 111 and the like. Container 120 can be configured to remain transparent until user interaction with container 120. Alternatively, container 120 can be configured to remain transparent regardless of user interaction. Menu 122 can be used to toggle container label 121 on which can be useful in allowing users to quickly identify appropriate containers. Optionally, label 121 can be suppressed when not needed.

Container 120 can be deleted which can result in the contents being placed on the desktop interface 110 once the container 120 has been removed. Alternatively, container 120 deletion can cause contents to be deleted from the desktop interface 110. Individual items in the container 120 can be deleted which can remove the item from the container 120 grouping and can be placed on the interface 110. Based on container 120 configuration, item deletion can result in the removal of the item from container 120 and interface 110.

In scenario 130, a desktop container 120 can be managed through menu 124 allowing container level actions to be performed. Any type of management control (toolbar, pop-up window, ribbon, etc.) can be used for containers and a menu is shown in scenario 130 for illustrative purposely only. Container 120 can allow container level interaction similar to icon 111 interaction. Container 120 level actions can include, but are not limited to, copying, moving, renaming, sorting, merging, and the like. In addition to container level actions, individual items within container 120 can be acted upon as normally. For instance, three items in container 120 can be selected and a new container can be created with the selected items using menu 124. Container 120 can permit sorting by one or more attributes such as creation date, modified date, name, last used, and the like.

In one implementation, two different types of container functions can exist. One type of container function can require at least one container be selected and the other can require two or more containers to be selected. For example, a sort-by-name function can require at least one container be selected, where all items inside the container are sorted by name, upon function selection. It is possible to select 1, 2, 3 . . . N containers by holding down the <CTRL> key and clicking on each container perimeter (or by performing some other interface action to select multiple containers) and then performing the short-by-name action concurrently for all selected containers.

A merge function is an example of a function that can require two or more containers to be selected, where all selected containers are consolidated into a single container. For instance, a user can hold down the <CTRL> key and click on container perimeters to select multiple containers. Then, a user can right click, which calls up a menu 124, and select merge 126 from this menu.

These selection mechanisms are not a limitation of the invention, but are provided as an example to illustrate concepts expressed herein. For example, another selection mechanism for the merge functional is as follows. Upon selection of entry 126 (when only one container 120 is initially selected as opposed to multiple ones), dialog 140 can be presented to continue the merge process. In dialog 140, a list of available containers 142 can be presented. Dialog 140 can present available containers using pull-down boxes, multi-selection fields, and the like. Available containers can include containers in the present interface 110, containers on one or more virtual desktops, and the like. For instance, container 120 "Widgets" can be merged with another container "Utilities" as shown in dialog 140 of scenario 130.

In one embodiment, desktop container 120 can present location specific context menus. Menu 122 can be presented when the cursor is placed over the label 121. Menu 124 can be presented when the cursor is placed over the desktop container contents. Alternatively menus 122, 124 can be combined into a single menu and presented regardless of cursor position within the container 120.

In one embodiment, an interface option can be configured which establishes whether a container is reactive to manipulations affecting a parent of the container. For example, a parent of a container 120 can be a desktop. When a use-parent-settings option is enabled and when a user performs an auto-arrange, align-to-grid, or other action on the desktop, the icons within a container can be adjusted in the same manner as other desktop icons. In a different embodiment, icons within a container can be adjusted relative to the container (as opposed to relative to the desktop), when a desktop layout manipulation action occurs (i.e., an auto-arrange manipulation can cause icons in a container to be auto-arranged within the container, as opposed to being auto-arranged relative to other "loose" icons on the desktop). When a use-parent-settings option is disabled, icons within the container will not be adjusted when other desktop icons are adjusted responsive to a desktop layout action. Different containers on a single desktop can have different values for whether desktop actions effect intra-container icons.

Drawings presented herein are for illustrative purposes only and should not be construed to limit the invention in any regard. Functionality presented in menus 122, 124 can be presented in a variety of ways including, but not limited to, drop-down menus, shortcut keys, and the like. Although illustrated as responsive to pointer device input, container 120 can be responsive to keyboard input, tactile input, and the like.

Figure 2:
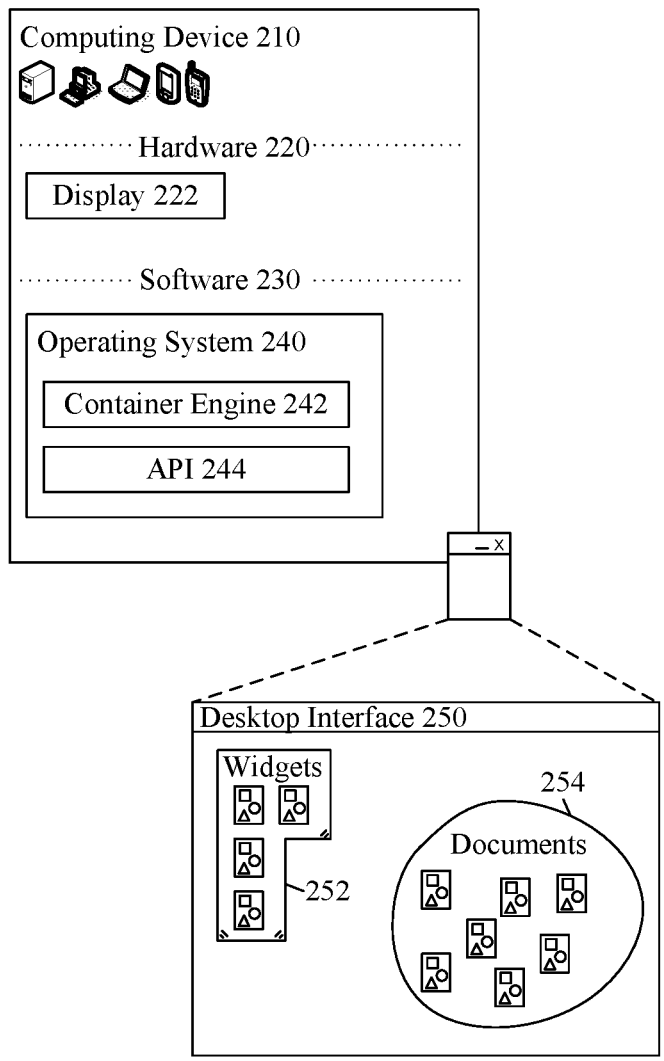
FIG. 2 is a schematic diagram illustrating a system for improving desktop icon management and grouping in accordance with an embodiment of the inventive arrangements disclosed herein.

FIG. 2 is a schematic diagram illustrating a system 200 for improving desktop icon management and grouping in accordance with an embodiment of the inventive arrangements disclosed herein. In system 200, a computing device 210 can be desktop container 252, 254 aware system able to manage and group icons within containers 252, 254. Interface 250 can be a computing desktop area permitting the presentation of desktop icons and containers 252, 254. In system 200, containers 252, 254 can be managed in a similar manner to desktop icons. For instance, containers 252, 254 can be handled in groups by a user, allowing easy manipulation of large quantities of icons. Containers 252 can group zero or more desktop icons, where containers 252 including zero (or one) desktop icons exist as "empty" or nearly empty containers, into which a user can later drag and drop items.

Computing device 210 can include hardware 220 and software 230. Hardware 220 can include one or more central processing units (CPU), one or more graphic processing units (GPU), a non-volatile memory, a volatile memory, and other such components interconnected via a bus. Hardware 220 can also include a port connecting device 210 to a display peripheral or an included display 222. The display 222 can utilize any of a variety of display technologies including, but not limited to, a Cathode Ray Tube (CRT) technology, a Liquid Crystal Display (LCD) technology, a Plasma display technology, and the like.

Software 230 can include operating system 240 which can include container engine 242 and API 244. In one embodiment, where an operating system kernel and a windows manager are distinct, the container engine 242 and the API 244 can interact with the windows manager. Operating system 240 can be a graphical user interface (GUI) capable system able to present interface 250 on a display 222.

Engine 242 can enable system 240 to identify and present containers 252, 254. API 244 can enable interaction between containers 252, 254 and system level objects (e.g., icons).

Interface 250 can represent a user interactive screen/desktop area. In one embodiment, interface 250 can be one of a set of virtual desktops, which can have desktop specific containers 252, 254. Alternatively, containers 252, 254 can be presented on all virtual desktops within system 240 or on a selected set of virtual desktops within system 240.

Container engine 242 can enable container 252, 254 presence and usage within interface 250. Engine 242 can establish baseline rules for manipulating and presenting container 252, 242 including, but not limited to anchoring, positioning, appearance, layout, and the like. In one embodiment, container 252, 254 can be restricted from occupying the same space (e.g., overlap) within interface 250. Engine 242 can facilitate desktop container 252, 254 presentation such as managing the internal and external layout of container 252, 254.

Engine 242 can establish icon layouts based on container 252, 254 shape, allowing each container 252, 254 to maintain individual layouts. Layouts can include a grid layout, a random layout, a freeform layout, and the like. Engine 252 can respond to additions, deletions, and icons movement within the container 252, 254 and dynamically adjust the layout based on container 252, 254 settings. The external flow layout of the container 252, 254 can be controlled by engine 252. GUI elements (e.g., icons) appearing outside/around the container 252, 254 can respond to the presence of the container. Layouts can include, but are not limited to, left align, right align, a flow layout, and the like. Further, margins around the container 252, 254 border can be configured to prohibit icon clustering.

Optionally, container 252, 254 functionality and behavior can be facilitated by API 244. API 244 can enable containers 252, 254 to be individually configured or global configured through a configuration panel. Configuration attributes can include, but are not limited to, position anchoring, sizing, layout, sorting, appearance, and the like. The API 244 can be an internal system API, external API toolkit, and the like.

In system 200, containers 252, 254 can be presented through the use of a windowing manager (e.g., container engine 242), whereby the container 252, 254 can be a "special" type of window. Unlike traditional "windows", the container 252, 254 can be effectively an overlay of a desktop or distinctive icon designated scheme, showing any type of visual marking denoting a set of icons are grouped together. For instance, container 252, 254 can lack maximize/minimize functionality, scrollbars, taskbar entries, and the like. In one embodiment, container 252, 254 can support scrollbar functionality, tabbed functionality, and the like. This functionality can be selectively enabled also, such as only being present when a container 252, 254 is minimized, or when an option to restrict a desktop area for a container is enabled. In one embodiment, container 252, 254 functionality can be extended to areas in system 240 where icons are presented. That is, use of containers 252, 254 is not restricted to a desktop interface 250. For example, container 252 can be present within a file manager application enabling grouping of similar items in a container 252 without being affected by the file manager organization scheme (e.g., sort by name). When shown in a file manager application, a special outline color, highlight, icon, attribute, and the like can denote which, if any, container 252, 254 an icon is associated with.

Figure 3:
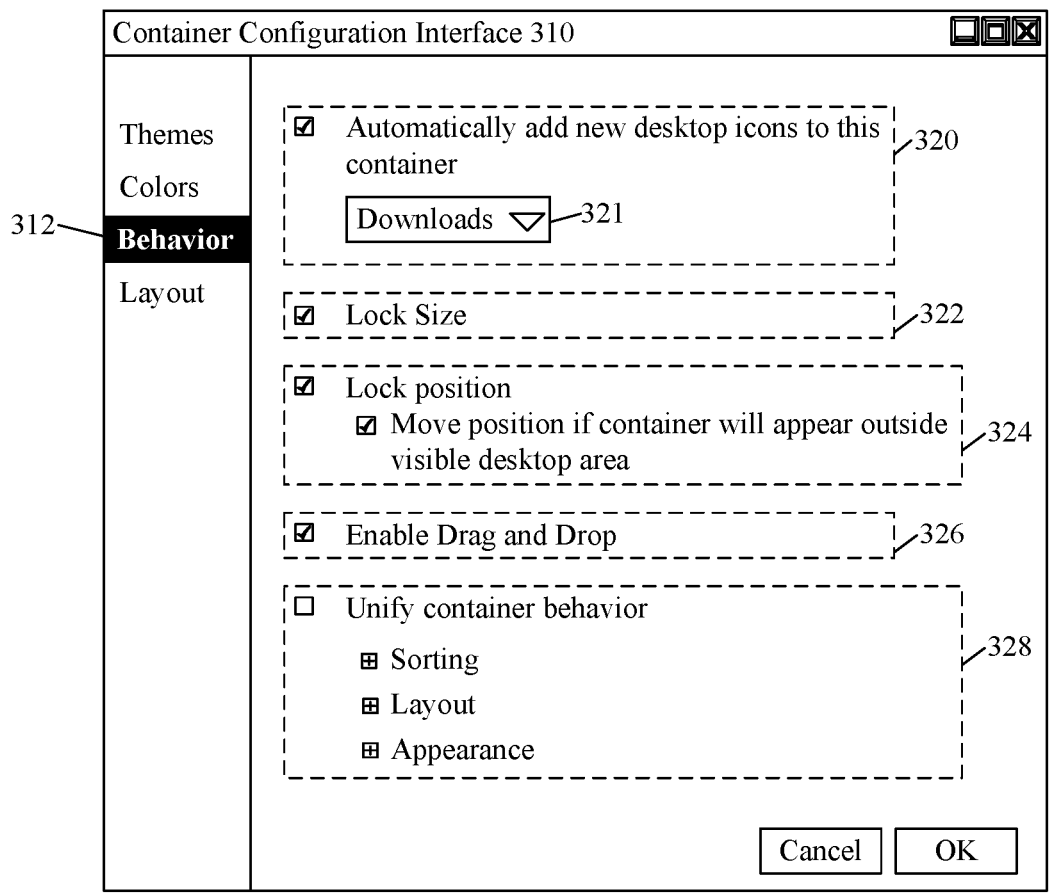
FIG. 3 is a schematic diagram illustrating an interface for configuring a desktop container in accordance with an embodiment of the inventive arrangements disclosed herein.

FIG. 3 is a schematic diagram illustrating an interface 310 for configuring a desktop container in accordance with an embodiment of the inventive arrangements disclosed herein.

Interface 310 can be a graphical user interface (GUI) presented in the context of system 200. In interface 310, desktop containers can be globally configured via interface 310. Each container can be configured individually or inherit settings from parameters configured in interface 310. In interface 310, container behavior can be modified to act in accordance with user needs.

Interface 310 can present configuration settings 320-328 useful in establishing consistent desktop container behavior. Setting 320 can enable a specified container to act as a catch-all container for new items being added to the desktop. For instance, an image downloaded from a Web browser can be automatically placed in the "Downloads" container 321 instead of being directly placed on the desktop.

To prevent accidental modification of containers, settings 322, 324 can be used to lock container attributes. Setting 322 can permit containers to be immune from resizing when the setting 322 is enabled. Setting 324 can prevent accidental container movement and can allow containers to maintain positioning on the desktop during screen size changes (e.g., resolution change). In scenarios where a container would be outside the visible screen area, setting 324 can allow containers to be repositioned with respect to the new screen size. For instance, when a locked container is positioned at the bottom right of a desktop and a screen resize occurs, the container can be repositioned to the bottom right of the desktop based on the new screen size.

Feature 326 can permit drag and drop actions to be performed on containers, such as adding, moving, and removing items within the container. Further, setting 326 can allow containers to be interacted with in the same manner as the container items. For instance, dragging a container into another container can trigger a merge container function. Disabling setting 326 can ensure accidental container modification does not occur during a drag and drop interaction with a desktop interface.

In setting 328, container behavior can be universally modified providing users with a rapid means to configure multiple containers. Container attributes such as sorting, layout, appearance, and the like can force uniform container behavior and presentation. Setting 328 can enable any combination of sorting, layout, and appearance uniformity for containers. For instance, containers can be forced to have an alphabetical sorting order, while maintaining container specific layout and appearance attributes.

Drawings presented herein are for illustrative purposes only and should not be construed to limit the invention in any regard. Interface 310 can be accessed from containers (e.g., context menu) or can be a system level configuration panel. Interface 310 can utilize GUI elements for settings 320-328 including, but not limited to, radio button, interactive buttons, drop-down menus, and the like.

The block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method, comprising:
associating a plurality of selected desktop icons on a graphical user interface (GUI) desktop with a desktop container;
receiving a user interaction with the desktop container;
performing, responsive to the user action, a container action that affects (i) each of the plurality of selected desktop icons or (ii) targets to which each of the plurality of selected desktop icons point; and
exposing a selectable interface option that selects, for the desktop container, between:
an attribute value that causes the desktop container to be configured only individually, and
an attribute value that causes the desktop container to be configured globally in response to a container action performed on a parent of the desktop container.

2. The method of claim 1, wherein
the user interaction changes a layout characteristic of the desktop container on the GUI desktop, and
the container action changes a layout characteristic of each of the plurality of selected desktop icons on the GUI desktop.

3. The method of claim 1, wherein
the user interaction changes an activation state of a set of targets to which each of the plurality of selected desktop icons point.

4. The method of claim 1, wherein
each of the plurality of selected desktop icons are adjacent to each other as presented upon the GUI desktop, and
a perimeter, as a visual depiction of the desktop container, is drawn around the plurality of selected desktop icons.

5. The method of claim 1, wherein
a color of an area behind each of the plurality of selected desktop icons is changed to indicate the association with the desktop container, and
different colors are utilized to visually indicate different desktop containers defined for the GUI desktop.

6. The method of claim 1, wherein
visible lines are drawn on the GUI desktop, and
each of the plurality of selected desktop icons is associated with an endpoint of one of the visible lines.

7. A computer hardware system, comprising:
a hardware processor programmed to initiate the following executable operations:
associating a plurality of selected desktop icons on a graphical user interface (GUI) desktop with a desktop container;
receiving a user interaction with the desktop container;
performing, responsive to the user action, a container action that affects (i) each of the plurality of selected desktop icons or (ii) targets to which each of the plurality of selected desktop icons point; and
exposing a selectable interface option that selects, for the desktop container, between:
an attribute value that causes the desktop container to be configured only individually, and
an attribute value that causes the desktop container to be configured globally in response to a container action performed on a parent of the desktop container.

8. The system of claim 7, wherein
the user interaction changes a layout characteristic of the desktop container on the GUI desktop, and
the container action changes a layout characteristic of each of the plurality of selected desktop icons on the GUI desktop.

9. The system of claim 7, wherein
the user interaction changes an activation state of a set of targets to which each of the plurality of selected desktop icons point.

10. The system of claim 7, wherein
each of the plurality of selected desktop icons are adjacent to each other as presented upon the GUI desktop, and
a perimeter, as a visual depiction of the desktop container, is drawn around the plurality of selected desktop icons.

11. The system of claim 7, wherein
a color of an area behind each of the plurality of selected desktop icons is changed to indicate the association with the desktop container, and
different colors are utilized to visually indicate different desktop containers defined for the GUI desktop.

12. The system of claim 7, wherein
visible lines are drawn on the GUI desktop, and
each of the plurality of selected desktop icons is associated with an endpoint of one of the visible lines.

13. A computer program product, comprising:
a hardware storage device having stored therein computer readable program code,
the computer readable program code, which when executed by a computer hardware system, causes the computer hardware system to perform:
associating a plurality of selected desktop icons on a graphical user interface (GUI) desktop with a desktop container;
receiving a user interaction with the desktop container;
performing, responsive to the user action, a container action that affects (i) each of the plurality of selected desktop icons or (ii) targets to which each of the plurality of selected desktop icons point; and
exposing a selectable interface option that selects, for the desktop container, between:
an attribute value that causes the desktop container to be configured only individually, and
an attribute value that causes the desktop container to be configured globally in response to a container action performed on a parent of the desktop container.

14. The computer program product of claim 13, wherein
the user interaction changes a layout characteristic of the desktop container on the GUI desktop, and
the user interaction changes an activation state of a set of targets to which each of the plurality of selected desktop icons point.

15. The computer program product of claim 13, wherein
the user interaction changes an activation state of a set of targets to which each of the desktop icons point.

16. The computer program product of claim 13, wherein
each of the plurality of selected desktop icons are adjacent to each other as presented upon the GUI desktop, and
a perimeter, as a visual depiction of the desktop container, is drawn around the plurality of selected desktop icons.

17. The computer program product of claim 13, wherein
a color of an area behind each of the plurality of selected desktop icons is changed to indicate the association with the desktop container, and
different colors are utilized to visually indicate different desktop containers defined for the GUI desktop.

18. The computer program product of claim 13, wherein visible lines are drawn on the GUI desktop, and each of the plurality of selected desktop icons is associated with an endpoint of one of the visible lines.

* * * * *